(12) United States Patent
Berfanger et al.

(10) Patent No.: US 10,341,504 B2
(45) Date of Patent: Jul. 2, 2019

(54) PHOTO RESPONSE NON-UNIFORMITY SUPPRESSION

(71) Applicant: HEWLETT-PACKARD DEVELOPMENT COMPANY, L.P., Houston, TX (US)

(72) Inventors: David Berfanger, Vancouver, WA (US); Jorge Miguel Gomez Lucia, San Diego, CA (US); John Hatcher, San Diego, CA (US); Hosein Ali Razavi, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/747,653

(22) PCT Filed: Oct. 2, 2015

(86) PCT No.: PCT/US2015/053775
§ 371 (c)(1),
(2) Date: Jan. 25, 2018

(87) PCT Pub. No.: WO2017/058254
PCT Pub. Date: Apr. 6, 2017

(65) Prior Publication Data
US 2018/0213092 A1 Jul. 26, 2018

(51) Int. Cl.
*H04N 1/60* (2006.01)
*H04N 1/00* (2006.01)
*H04N 1/401* (2006.01)

(52) U.S. Cl.
CPC ..... *H04N 1/00087* (2013.01); *H04N 1/00018* (2013.01); *H04N 1/401* (2013.01)

(58) Field of Classification Search
None
See application file for complete search history.

(56) References Cited

U.S. PATENT DOCUMENTS

| 6,392,216 B1 | 5/2002 | Peng-Tan |
| 2002/0122213 A1* | 9/2002 | Hill ........................ H04N 1/401 358/474 |

(Continued)

FOREIGN PATENT DOCUMENTS

| CN | 1297645 | 5/2001 |
| CN | 1591464 | 3/2005 |

(Continued)

OTHER PUBLICATIONS

Ferrero; "Correction of Photoresponse Nonuniformity for Matrix Detectors Based on Prior Compensation for Their Nonlinear Behavior"; OSA Publishing; Apr. 10, 2006 http://www.ncbi.nlm.nih.gov/pubmed/16623238.

*Primary Examiner* — Henok Shiferaw
(74) *Attorney, Agent, or Firm* — Brooks Cameron & Huebsch PLLC

(57) ABSTRACT

Example implementations relate to PRNU suppression. For example, PRNU suppression may include performing a calibration surface PRNU characterization using a scanning system, performing a document-based PRNU characterization using the scanning system, and determining a correction function for PRNU suppression for the scanning system based on the calibration surface PRNU characterization and the document-based PRNU characterization.

16 Claims, 4 Drawing Sheets

(56) References Cited

U.S. PATENT DOCUMENTS

| | | | |
|---|---|---|---|
| 2002/0171819 A1* | 11/2002 | Cheung | G03B 1/00 355/133 |
| 2005/0029352 A1 | 2/2005 | Spears | |
| 2007/0158536 A1 | 7/2007 | Gann | |
| 2008/0158396 A1* | 7/2008 | Fainstain | H04N 5/361 348/246 |
| 2010/0237149 A1 | 9/2010 | Olmstead | |
| 2013/0250138 A1 | 9/2013 | Safai, et al. | |
| 2014/0211268 A1* | 7/2014 | Huang | H04N 1/00018 358/406 |
| 2017/0155798 A1* | 6/2017 | Yap | H04N 1/0473 |

FOREIGN PATENT DOCUMENTS

| | | |
|---|---|---|
| CN | 101532948 | 9/2009 |
| JP | 2002-325168 A | 11/2002 |
| JP | 2004133344 | 4/2004 |

\* cited by examiner

PHOTO RESPONSE NON-UNIFORMITY SUPPRESSION

BACKGROUND

Many scanner type devices, from flat-bed scanners to high end photocopiers, use reflected illumination from a light source to generate copies of images. In these devices, the photo-response from pixel to pixel may be imperfect. Calibration systems may improve the response and help counter the variability. Still, banding, streaking, color shifts and other imaging artifacts may be often observed in scanned images.

DETAILED DESCRIPTION

Figure 1:
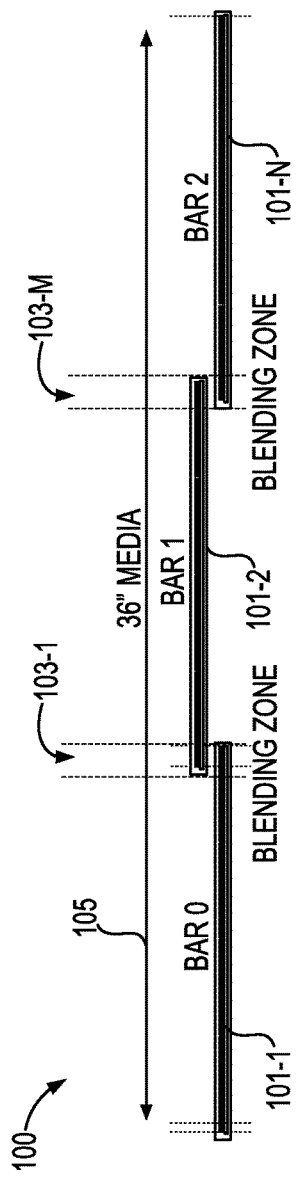
FIG. 1 illustrates an example scanning system for photo response non-uniformity (PRNU) suppression according to the present disclosure.

A scanning system may comprise a capture apparatus for producing a digital representation of the spatial variations in reflectance over a document or sheet of reflective media. The capture apparatus may comprise an optical system, a sensor system and a processing system. The optical system may illuminate the document and direct light reflected from the document onto the sensor system. The sensor system may produce a response signal that quantifies the amount of light reflected from the sample and makes those response signals available to the processing system. The processing system may obtain the response signals from the sensor system and convert the response signals into corresponding digital pixel values that record a relative indication of the local reflectance values (0% to 100%) at corresponding sample points on the document.

A single cycle of illuminating the document, sensing the reflected illumination and converting the sensor response into pixel values comprises an "exposure". After an exposure, the capture apparatus may produce a single raster of pixels, representing a one-dimensional lateral sampling of the local reflectance of the document. As used herein, a raster refers to a grid of x and y coordinates on a display space, and for three-dimensional images, a z coordinate. Put another way, a raster refers to a dot matrix data structure representing a generally rectangular grid of pixels, or points of color, viewable via a monitor, paper, or other display medium. The scanning system may further include a mechanism for affecting the relative longitudinal positioning of the capture apparatus and the document in order to acquire multiple rasters of pixels for producing a digital image of a two-dimensional region of the document.

As described above, the sensor system of a scanning system may comprise an array of light-sensitive elements, or photosites. Each of the photosites may convert incident light into electronic response signals, where the more intense the incident light, the stronger the response signals. The magnitude of a response signal produced by a photosite as a function of the intensity of the incident illumination is referred to herein as the photo response of the photosite.

While photosites may be designed to provide a consistent photo response to the incident light level, random fluctuations in the physical properties of individual photosites may cause each photosite to respond differently to a uniform illumination across the array, resulting in a corruption of the response signals with temporally stable, spatially non-uniform noise, independent of the document itself. This corruption of the response signal is referred to herein as a photo response non-uniformity (PRNU).

PRNU suppression according to the present disclosure enables large format scanning using a plurality of scan bars, referred to herein as capture apparatuses, which may be mounted in the scanning system with a staggered positioning both laterally and longitudinally. The individual scan bars may each separately scan large documents, such as documents in A3 format, and the plurality of scan bars together may be arranged to jointly scan large documents, for instance, documents up to 36 inches wide. According to the present disclosure, PRNU may be suppressed in "blending zones" in the resultant image. As used herein, a blending zone refers to an area in a scanned image across which pixels from neighboring scan bars image common regions of the source document. Put another way, PRNU suppression according to the present disclosure may provide compensation factors to blend scanned images collected from multiple scan bars in a scanning system.

FIG. 1 illustrates an example scanning system 100 for PRNU suppression according to the present disclosure. As illustrated in FIG. 1, the scanning system 100 may include a plurality of scan bars 101-1, 101-2, 101-N (collectively referred to herein as scan bars 101). While the scanning system 100 is illustrated in FIG. 1 as having three scan bars, e.g., capture apparatuses, examples are not so limited, and the scanning system 100 may include more or fewer scan bars 101 than illustrated. Similarly, scan bar 101-1 may be referred to herein as "bar 0", scan bar 101-2 may be referred to as "bar 1", and scan bar 101-N may be referred to as "bar 2".

Each of the plurality of scan bars 101 may be staggered laterally within the scanning system 100. For example, as illustrated in FIG. 1, scan bar 101-1 may be arranged on a first distal end of scan bar 101-2, and scan bar 101-N may be arranged on a second distal end of scan bar 101-2, opposite the first distal end. As such, each of scan bars 101-1 and 101-N may flank scan bar 101-2, such that scan bar 101-2 is a center scan bar.

Similarly, each of the plurality of scan bars 101 may be staggered longitudinally within the scanning system 100. For instance, scan bar 103-1 may be arranged proximal to media 105, relative to scan bars 101-1 and 101-N. Similarly, scan bars 101-1 and 101-N may be arranged distal to medial 105, relative to scan bar 101-2. As such, the plurality of scan bars 101 may be arranged in a plurality of manners, such that the scan bars are both longitudinally and laterally staggered.

As illustrated in FIG. 1, the plurality of scan bars 101 may overlap by some distance. The region within which a plurality of scan bars 101 overlap, is referred to herein as a blending zone. Put another way, a blending zone refers to an area in the scanning system 100 where pixels from adjacent scan bars 101 image (e.g., scan) common regions of the source document (e.g., media 105). For instance, scan bar 101-1 may overlap longitudinally and laterally with scan bar 101-2, resulting in blending zone 103-1. Similarly, scan bar 101-N may overlap longitudinally and laterally with scan bar 101-2, resulting in blending zone 103-M. Blending zones 103-1 and 103-M are collectively referred to herein as blending zones 103. Notably, the scan bars 101 are not restrained to the configuration illustrated in FIG. 1. For example, scan bars 101-1 and 101-N may be arranged proximal to media 105, relative to scan bar 101-2.

Figure 2:
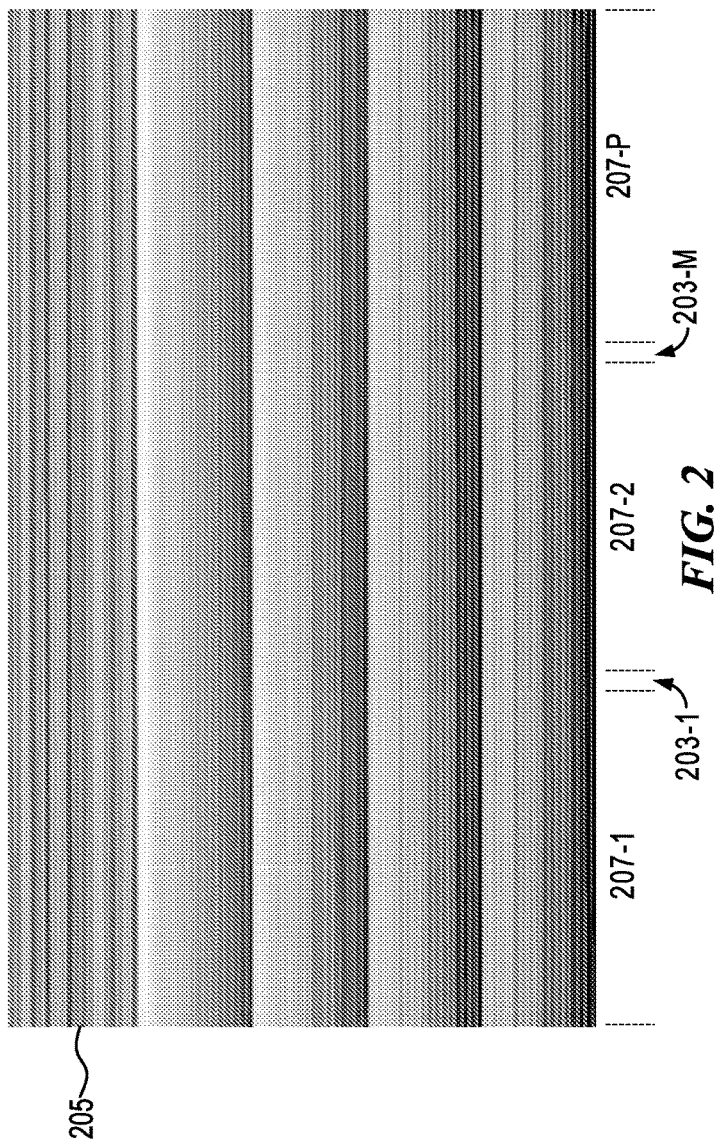
FIG. 2 illustrates an example image from a large format capture apparatus in absence of PRNU suppression.

FIG. 2 illustrates an example image 205 from a large format capture apparatus in the absence of PRNU suppression. The scanned image 205 may be generated using scanning system 100 illustrated in FIG. 1. The image 205 captured by each individual scan bar may be free of spatially non-uniform noise due to individual calibration of each scan bar. However, when aligned and stitched together, there may be an abrupt discontinuity in color and or tone when transitioning from apparatus to apparatus. This discontinuity may be a localized effect at the blending zones 203-1 and 203-M. The scanned image 205 may include blending zones 203-1 and 203-M, corresponding to blending zones 103-1 and 103-M illustrated in FIG. 1. Within blending zones 203, differences between signals generated by the respective scan bars 101 may result in PRNUs within the scanned image. For instance, scan bar 101-1 illustrated in FIG. 1 may generate scanned image 207-1, scan bar 101-2 may generate scanned image 207-2, and scan bar 101-N may generate scanned image 207-P. Within blending zone 203-1, both of scan bar 101-1 and scan bar 101-2 may generate signals to produce the scanned image displayed in blending zone 203-1, and the signals between the scan bars may differ, resulting in PRNUs within blending zone 203-1. Similarly, the signals generated by scan bar 101-1 may differ from the signals generated by scan bar 101-2, such that the scanned image 207-1 may differ from scanned image 207-2.

Figure 3:
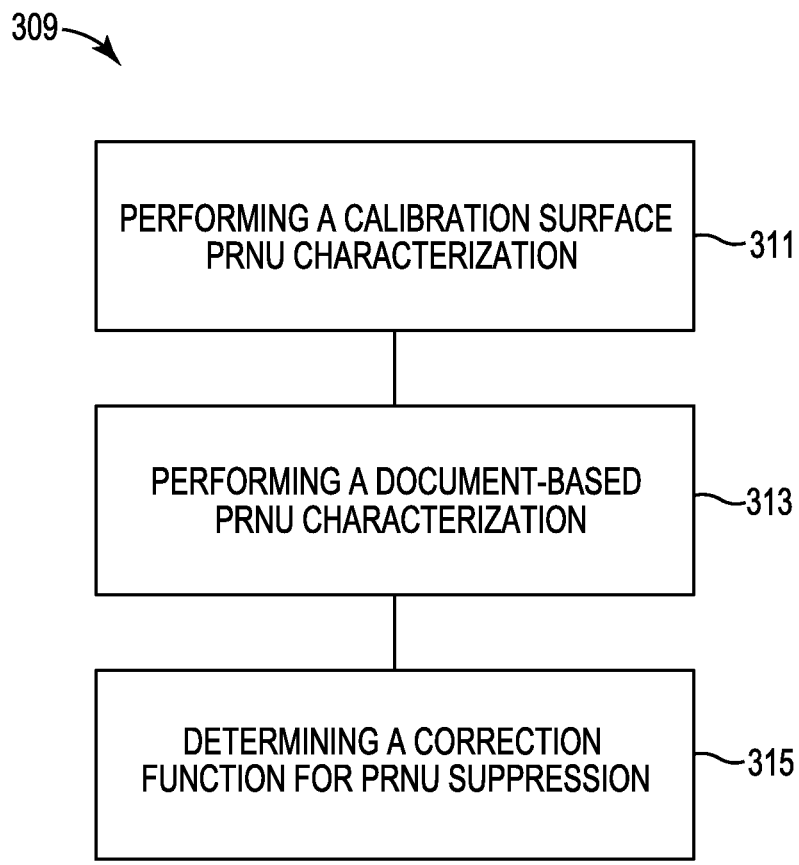
FIG. 3 illustrates an example method for PRNU suppression according to the present disclosure.

FIG. 3 illustrates an example method 309 for PRNU suppression according to the present disclosure. While fluctuations in the physical properties of photosites were discussed herein as a source of PRNU, examples are not so limited. Other components of a capture apparatus may induce signal noise which may result in bar-to-bar mismatches in a scanned image. For example, the optical system may comprise a light source and a lens system for illuminating the sample uniformly and then directing light reflected from the sample onto the sensor system. However, design limitations may result in the light source providing to the sample a non-uniform illumination profile, and aberrations in the lens system may further corrupt the illumination profile directed to the sensor system, inducing fixed-pattern artifacts in the resulting image. All sources of signal noise which result in bar-to-bar mismatches in the scanned image are generally referred to herein as PRNU.

As illustrated in FIG. 3, at 311 the method 309 may include performing calibration surface PRNU characterization using a scanning system, such as scanning system 100 illustrated in FIG. 1. For example, performing the calibration surface PRNU characterization may include imaging a plurality of calibration surfaces of the scanning system, and determining a calibration surface PRNU corrected output value based on the imaged calibration surface. As used herein, a calibration surface refers to a known and/or controlled reference in the scanning system which may be scanned to form a PRNU characterization. Examples of a calibration surface may include support sliders, as described herein, rollers, belts, fixed surfaces, among other surfaces. Put another way, each of the plurality of processing systems may adjust the calibration surface PRNU targets for every pixel in the corresponding capture apparatus (e.g., scan bar) by the respective correction function (e.g., respective ratio), as discussed further herein.

The scanning system 100 may be arranged with the scan bars (e.g., scan bars 101 illustrated in FIG. 1) in fixed mounts on a top lid such that during a scan, the longitudinal positioning of a document relative to the scan bars is affected by a feed mechanism that transports the document under the scan bars and across the scan zone. The feed mechanism may comprise feed wheels and support sliders, herein referred to as "sliders", which may work together to bias the document upwards and flush against the scan bars during the scan. In some examples, the sliders may be white in color, although examples are not so limited and the sliders may be colors other than white.

Prior to scanning, calibration surface PRNU characterization may be performed by imaging the calibration surface of the scanning system. A gain m, an offset b, and a curvature c may be determined for each pixel column on the scanned image, and a calibration surface PRNU corrected output value based on the imaged calibration surface may be determined. Determining the gain m, offset b and curvature c may require a plurality (i.e. three) of exposures at different uniform intensity levels. Dark and white exposures may be used with the addition of an exposure at an intermediate illumination level somewhere in the middle of the response range of the photosites, referred to herein as a gray value. The white and dark targets may each be assigned target output values; e.g., if d were the dark value then the dark target would be represented by $d_t$ and if w were the white value then the white target would be represented by $w_t$. Similarly, if g were the gray value then the gray target would be represented by $g_t$.

The corrected scanner output may be determined according to the following operation $$y = cx^2 + mx + b \qquad (1)$$

Where y is the corrected scanner output, c is the curvature, x is the response signal produced by a particular photosite, m is the gain, and b is the offset.

Within a blending zone (e.g., blending zone 103-1 illustrated in FIG. 1 and/or blending zone 203-1 illustrated in FIG. 2), the responses of each of two corresponding pixel columns from overlapping scan regions may be determined respectively by:

$$y_0 = c_0 x_0^2 + m_0 x_0 + b_0 \qquad (2)$$

and $$y_1 = c_1 x_1^2 + m_1 x_1 + b_1 \qquad (3)$$

where for a system well-characterized with regards to scanning the calibration surface $y_0 \approx y_1$ and $$d_t = c_0 d_0^2 + m_0 d_0 + b_0 = c_1 d_1^2 + m_1 d_1 + b_1 \qquad (4)$$

$$g_t = c_0 g_0^2 + m_0 g_0 + b_0 = c_1 g_1^2 + m_1 g_1 + b_1 \qquad (5)$$

$$w_t = c_0 w_0^2 + m_0 w_0 + b_0 = c_1 w_1^2 + m_1 w_1 + b_1 \qquad (6)$$

However, the system may be poorly characterized for scanning a document. For example, if u is the response signal for a photosite when scanning a document, then the calibration surface PRNU corrected output v may be determined as follows:

$$v = cu^2 + mu + b \qquad (7)$$

In this case, within a blending zone (e.g., blending zone 103-1 illustrated in FIG. 1), the corrected output responses of each of the same two corresponding pixels from overlapping scan regions may be given respectively by:

$$v_0 = c_0 u_0^2 + m_0 u_0 + b_0 \quad (8)$$

$$v_1 = c_1 u_1^2 + m_1 u_1 + b_1 \quad (9)$$

Yet, while it may be that $y_0 \approx y_1$ when scanning the calibration surface, it may be the case that $v_0$ is significantly different than $v_1$ when scanning a document.
In such cases, there may be PRNU parameters for one of the bars, say bar 0, such that:

$$\dot{v}_0 = \dot{c}_0 u_0^2 + \dot{m}_0 u_0 + \dot{b}_0 \quad (10)$$

where $\dot{v}_0 \approx v_1$. Further, alternate PRNU target values may be used which would lead to the same parameters being obtained from scanning the calibration surface. That is, for scan bar 1, the old PRNU targets may be retained:

$$d_t = c_1 d_1^2 + m_1 d_1 + b_1 \quad (11)$$

$$g_t = c_1 g_1^2 + m_1 g_1 + b_1 \quad (12)$$

$$w_t = c_1 w_1^2 + m_1 w_1 + b_1 \quad (13)$$

while for scan bar 0, new PRNU targets may be selected such that:

$$\dot{d}_t = \dot{c}_0 d_0^2 + \dot{m}_0 d_0 + \dot{b}_0 \quad (14)$$

$$\dot{g}_t = \dot{e}_0 g_0^2 + \dot{m}_0 g_0 + \dot{b}_0 \quad (15)$$

$$\dot{w}_t = \dot{c}_0 w_0^2 + \dot{m}_0 w_0 + \dot{b}_0 \quad (16)$$

In such a manner, determining the calibration surface PRNU characterization may include determining a blended region output response for each of a plurality of overlapping regions in an output of the scanning system.

At 313, the method 309 may include performing a document-based PRNU characterization using the scanning system. To determine these additional PRNU parameters, a raw scan of a document with white ω, gray γ and black δ regions may be obtained within the blending zones of the scanner, and new target values using the calibration surface PRNU calibration of the center bar (e.g., scan bar 101-2 illustrated in FIG. 1) may be determined as follows:

$$\delta_t = c_1 \delta_1^2 + m_1 \delta_1 + b_1 \quad (17)$$

$$\gamma_t = c_1 \gamma_1^2 + m_1 \gamma_1 + b_1 \quad (18)$$

$$\omega_t = c_1 \omega_1^2 + m_1 \omega_1 + b_1 \quad (19)$$

The determination of the above values may allow for the determination of $\dot{c}_0$, $\dot{m}_0$ and $\dot{b}_0$ such that:

$$\delta_t = \dot{c}_0 \delta_0^2 + \dot{m}_0 \delta_0 + \dot{b}_0 \quad (20)$$

$$\gamma_t = \dot{c}_0 \gamma_0^2 + \dot{m}_0 \gamma_0 + \dot{b}_0 \quad (21)$$

$$\omega_t = \dot{c}_0 \omega_0^2 + \dot{m}_0 \omega_0 + \dot{b}_0 \quad (22)$$

And, using operations 14, 15, and 16, new calibration surface PRNU targets may be determined for bar 0.

At 315, the method 309 may include determining a correction function for PRNU suppression for the scanning system based on the calibration surface PRNU characterization and the document-based PRNU characterization. For example, a ratio may be determined correlating the calibration surface PRNU characterization to the document-based PRNU characterization. This ratio may be stored in memory, and used for future corrected calibration surface PRNU characterization to be performed on scanned images. In some examples, the method 309 may include suppressing PRNU regions in the output of the scanning system by applying the correction function to the output.

Figure 4:
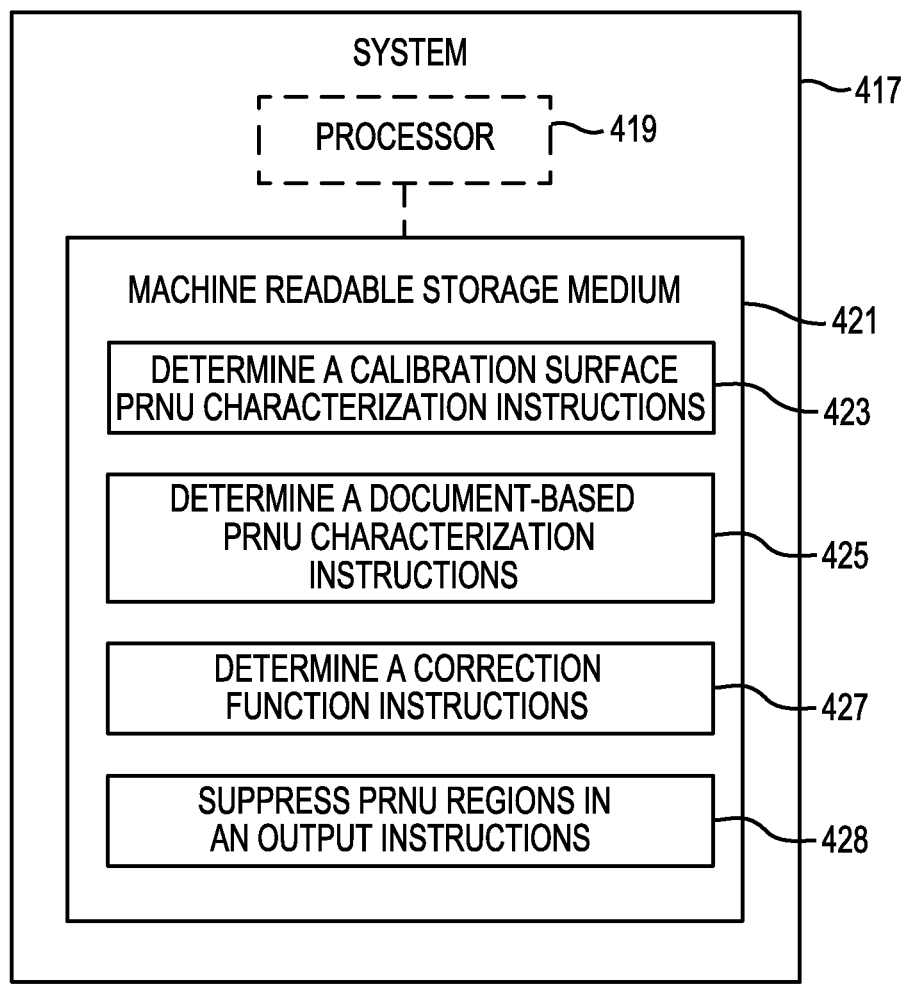
FIG. 4 is a block diagram of an example system for detecting document objects, according to the present disclosure.

FIG. 4 is a block diagram of an example system 417 for PRNU suppression, according to the present disclosure. System 417 may include at least one computing device that is capable of communicating with at least one remote system. In the example of FIG. 4, system 417 includes a processor 419 and a machine-readable storage medium 421. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 419 may be one or more central processing units (CPUs), microprocessors, and/, or other hardware devices suitable for retrieval and execution of instructions stored in machine-readable storage medium 421. In the particular example shown in FIG. 4, processor 419 may receive, determine, and send instructions 423, 425, 427, 428 for detecting document objects. As an alternative or in addition to retrieving and executing instructions, processor 419 may include one or more electronic circuits comprising a number of electronic components for performing the functionality of one or more of the instructions in machine-readable storage medium 421. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 421 may be any electronic, magnetic, optical, or other physical storage device that stores executable instructions. Thus, machine-readable storage medium 421 may be, for example, Random Access Memory (RAM), an Electrically-Erasable Programmable Read-Only Memory (EEPROM), a storage drive, an optical disc, and the like. Machine-readable storage medium 421 may be disposed within system 421, as shown in FIG. 4. In this situation, the executable instructions may be "installed" on the system 417. Additionally and/or alternatively, machine-readable storage medium 421 may be a portable, external or remote storage medium, for example, that allows system 417 to download the instructions from the portable/external/remote storage medium. In this situation, the executable instructions may be part of an "installation package". As described herein, machine-readable storage medium 421 may be encoded with executable instructions for monitoring network utilization.

Referring to FIG. 4, determine a calibration surface PRNU characterization instructions 423, when executed by a processor (e.g., 419), may cause system 417 to determine a calibration surface PRNU characterization using a scanning system. As discussed in relation to FIG. 3, determining a calibration surface PRNU characterization may include defining a dark calibration surface PRNU compensation target $d_t$ and a light calibration surface PRNU compensation target $w_t$. Similarly, the calibration surface in the scanning system may be scanned at dark d, medium (e.g., gray) g and light w levels, and a medium (e.g., gray) calibration surface PRNU compensation target $g_t$ may be determined from selected pixels of the scan of the calibration surface. Put another way, the determine a calibration surface PRNU characterization instructions 423 may include instructions to determine a calibration surface PRNU compensation target for an intermediate illumination level.

Determining a calibration surface PRNU characterization may include providing a common correction across all scan bars such that the discontinuity in the blending zones is mitigated, while the slowly varying profile is allowed to persist. For this purpose, the average response of neighboring scan bars within the blending zone between them may be considered. When scanning the calibration surface, the averages $\langle y_0 \rangle_R$ and $\langle y_1 \rangle_L$ may denote the blending zone between bar 0 and bar 1, and averages $\langle y_1 \rangle_R$ and $\langle y_2 \rangle_L$ may denote the blending zone between bar 1 and bar 2. Put another way, determining a calibration surface PRNU characterization may include determining an average signal response between a plurality of adjacent scan bars in the scanning system. For a system well-characterized with regards to scanning the calibration surface, it may be that $\langle y_0 \rangle_R \approx \langle y_1 \rangle_L$ and $\langle y_1 \rangle_R \approx \langle y_2 \rangle_L$. Similarly, when scanning a document, the averages $\langle v_0 \rangle_R$ and $\langle v_1 \rangle_L$ may denote the blending zone between bar 0 and bar 1, and averages $\langle v_1 \rangle_R$ and $\langle v_2 \rangle_L$ may denote the blending zone between bar 1 and bar 2.

Furthermore, as discussed in relation to FIG. 3, the instructions to determine a calibration surface PRNU characterization may include instructions to calculate calibration surface PRNU compensation parameters for each pixel in the scanned image of the calibration surface. For instance, a gain m, an offset b, and a curvature c may be determined for each pixel column on the scanned image of the calibration surface.

Determine a document-based PRNU characterization instructions 425, when executed by a processor (e.g., 419), may cause system 417 to determine a document-based PRNU characterization using the scanning system. For example, a test document may be scanned, using the scanning system, at a dark level δ, a medium level γ and a light level ω. From the scan of the test document, document-based PRNU compensation targets $\delta_t$, $\gamma_t$, and $\omega_t$ may be determined from selected reference pixels of the document scan and corresponding calibration surface PRNU correction parameters. From these values, document-based PRNU compensation parameters $\dot{c}$, $\dot{m}$, and $\dot{b}$ may be determined for pixels of the document scan, as discussed in regards to FIG. 3.

Determine a correction function instructions 427, when executed by a processor (e.g., 419), may cause system 417 to determine a correction function for PRNU suppression for the scanning system based on the calibration surface PRNU characterization and the document-based PRNU characterization. Using PRNU corrections determined by scanning the calibration surface and a trial scan of a test document, adjustment functions may be determined for each scan bar, which may be applied to the PRNU targets of each of the pixels of a selected scan bar. Collectively, the adjustment functions for each scan bar are referred to herein as a correction function. For example, adjustment functions may be approximated as ratios derived from pixel values from the blending zones of the document scan:

$$r_0 = \frac{\langle v_1 \rangle_L}{\langle v_0 \rangle_R} \qquad (23)$$

$$r_2 = \frac{\langle v_1 \rangle_R}{\langle v_2 \rangle_L} \qquad (24)$$

These ratios may be stored. Then, in performing a subsequent calibration surface PRNU characterization, the calibration surface PRNU targets may be adjusted for every pixel in each of the outside scan bars (e.g., scan bars 101-1 and 101-N illustrated in FIG. 1) by the respective ratio. Put another way, in subsequent scans, the outer scan bars may be adjusted by a specified ratio to conform with the image produced by the center scan bar (e.g., scan bar 101-2 illustrated in FIG. 1). In adjusting the calibration surface PRNU targets, the following operations may be used:

$$\dot{d}_t = r d_t \qquad (25)$$

$$\dot{g}_t = r g_t \qquad (26)$$

$$\dot{w}_t = r w_t \qquad (27)$$

Suppress PRNU regions in an output instructions 428, when executed by a processor (e.g., 419), may cause system 417 to suppress PRNU regions in an output of the scanning system by adjusting calibration surface PRNU targets according to the calibration surface PRNU characterization and the document based PRNU characterization. In some examples, the suppress PRNU regions in an output instructions 428 may cause the system to suppress PRNU regions in an output of the scanning system by applying the determined correction function to the output.

Figure 5:
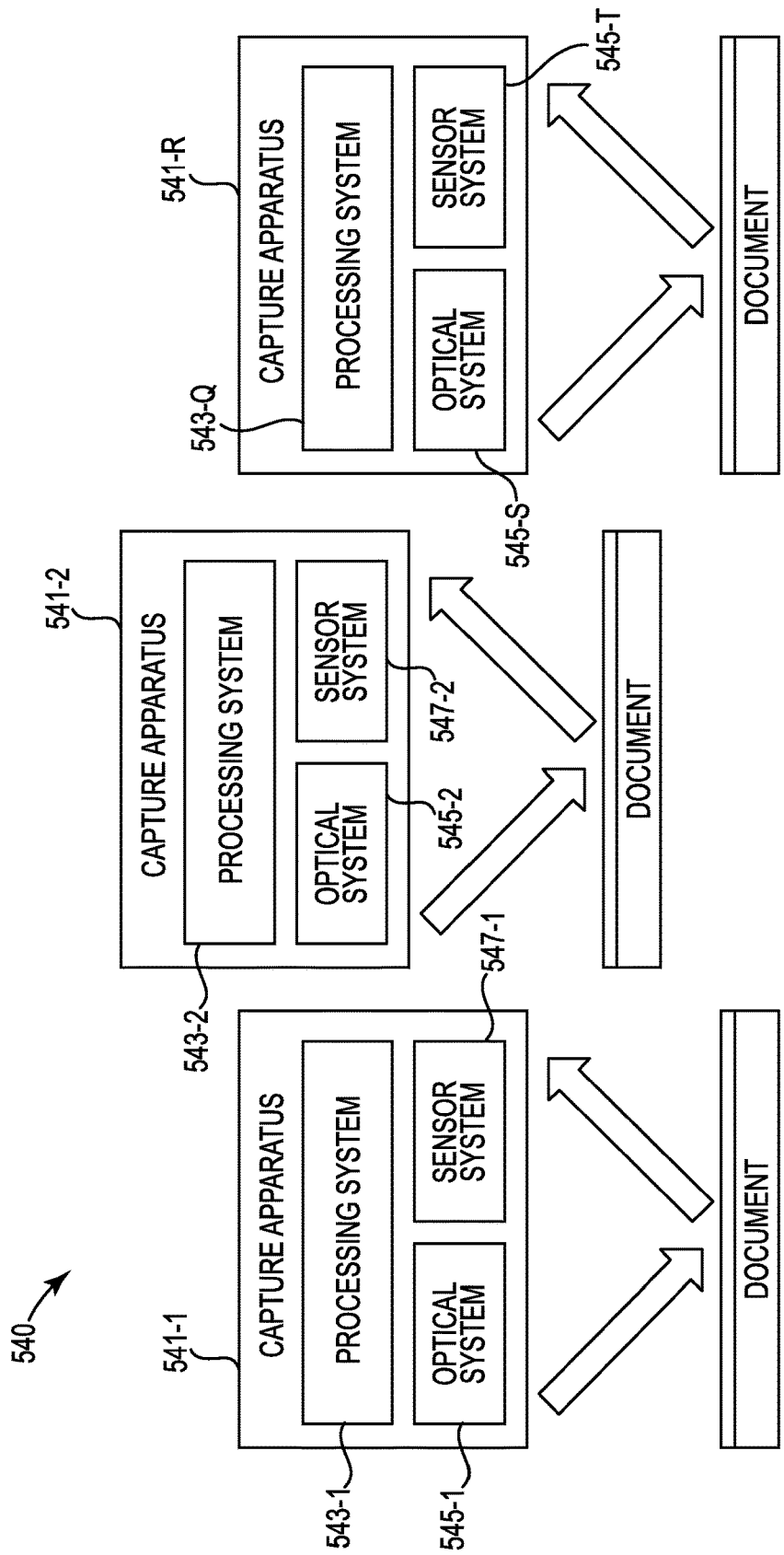
FIG. 5 illustrates an example large format capture apparatus for PRNU suppression according to the present disclosure.

FIG. 5 illustrates an example large format capture apparatus 540 for PRNU suppression according to the present disclosure. As used herein, a large format capture apparatus refers to a capture apparatus capable of scanning large documents, for example, documents 36 inches wide. As illustrated in FIG. 5, the large format capture apparatus 540 may include a plurality of capture apparatuses 541-1, 541-2, and 541-R (collectively referred to herein as capture apparatuses). Each capture apparatus may include a number of components. For example, each capture apparatus may include a processing system 543-1, 543-2, 543-Q (collectively referred to herein as processing systems 543), an optical system 545-1, 545-2, 545-S (collectively referred to herein as optical systems 545), and a sensor system 547-1, 547-2, 547-T (collectively referred to herein as sensor systems 547).

As described herein, the optical system may illuminate the document and direct light reflected from the document onto the sensor system. The optical system may collect reflected light and provide the collected light to an array of light sensitive receivers (e.g., pixels). In some examples, the optical system may be a rod lens array. The optical system may include a light source, and in some examples, may selectively illuminate an area of interest in a document. Additionally and/or alternatively, each capture apparatus may include a light source separate from the optical system, and the separate light source may selectively illuminate the area of interest on the document.

The sensor system may produce a response signal that quantifies the amount of light reflected from the sample and makes those response signals available to the processing system. The sensor system may include an array of light sensitive receivers to generate signals based on received light. Each component of this array may be referred to as a pixel. The processing system may obtain the response signals from the sensor system and convert the response signals into corresponding digital pixel values that record a relative indication of the local reflectance values (0% to 100%) at corresponding sample points on the document.

A capture apparatus may comprise Contact Image Sensor (CIS) technology. A CIS optical system may comprise a light source of various color light emitting diodes (LEDs), a dispersing light guide and a rod lens array for imaging at 1:1 magnification. A CIS sensor system may comprise many individual Charge Coupled Device (CCD) chips that are butted end-to-end to form an array of light-sensitive elements nine to twelve inches long. A CIS processing system may comprise hardware for converting the response signals from the sensor system into digital pixel values. All of the components of a CIS capture apparatus may be assembled into a compact module or "scan bar", as used herein.

Furthermore, each of the capture apparatuses 541 may be paired with a calibration surface, resulting in a capture apparatus-calibration surface pair.

As described in relation to FIG. 1, each of the capture apparatuses 541 may be staggered laterally and longitudinally to create blending zones. Notably, FIG. 5 illustrates the capture apparatuses 541 arranged to not overlap for illustration purposes only. The large format capture apparatus 540 may include control logic (not illustrated in FIG. 5) to control radiant power and timing of each of each of a plurality of light sources, and calibration logic to determine a calibration operator for selected pixel based data for each capture apparatus-calibration surface pair. Similarly, the large format capture apparatus 540 may include calibration logic (not illustrated in FIG. 5) to correct pixel to pixel imperfections in each of the three images captured by each capture apparatus-calibration surface pair. Similarly, the large format capture apparatus 540 may include blending logic to align captured images in a lateral and longitudinal direction and stitch them together by applying the blending operation to overlap pixels and deliver a single image, as described in relation to FIGS. 1, 2, 3, and 4.

As described in relation to FIGS. 1, 2, 3, and 4, each of the processing systems 543 may determine a calibration surface PRNU characterization by scanning the calibration surface in the scanning system. For instance, a dark calibration surface PRNU compensation target $d_t$ and a light calibration surface PRNU compensation target $w_t$ may be defined. The calibration surface may then be scanned at three different light levels, dark d, light w, and intermediate (e.g., gray) g. Next, a calibration surface PRNU compensation target $g_t$ for the intermediate (e.g., gray) may be determined from selected pixels of the calibration surface scan (e.g., the image produced from scanning the calibration surface). Further, calibration surface PRNU compensation parameters c, m, and b may be determined for each pixel. Put another way, each processing system 543 may determine calibration surface PRNU compensation parameters c, m, and b for each pixel in a respective scan region for the associated processing system.

Furthermore, the processing systems 543 may each determine a document-based PRNU characterization. As described herein, a test document may be scanned at a dark level δ, a medium level γ and a light level ω, and document-based PRNU compensation targets $δ_t$, $γ_t$, and $ω_t$ may be determined from selected reference pixels of the document scan and corresponding calibration surface PRNU correction parameters.

The document-based PRNU compensation parameters $ċ$, $ṁ$, and $ḃ$ may be determined for pixels of the document scan. A correction function (e.g., modified calibration surface PRNU targets $ḋ_t$, $ġ_t$, and $ẇ_t$) for PRNU suppression may be determined for pixels based on the calibration surface PRNU characterization ad the document-based PRNU characterization, and PRNU regions may be suppressed in an output of the scanning system (e.g., large format capture apparatus) by applying the correction function to the output.

In some examples, a blank sheet of media may be used instead of a test document, in which six different ratios may be used to determine the document-based PRNU characterization. For example, the blank sheet of media may be scanned using the exact same LED on-times as is used during calibration surface PRNU characterization. For the calibration surface scans the following would apply:

$$\frac{\langle y_1 \rangle_L}{\langle y_0 \rangle_R} \approx \frac{\langle y_1 \rangle_R}{\langle y_2 \rangle_L} \approx 1$$

whereas for document scans six different ratios may be used: three at each blending zone for the three on-times (e.g., turn on times corresponding to the light, dark, and intermediate light levels):

$$r_{0|δ} = \frac{\langle v_{1|δ} \rangle_L}{\langle v_{0|δ} \rangle_R}, r_{2|δ} = \frac{\langle v_{1|δ} \rangle_R}{\langle v_{2|δ} \rangle_L}$$

$$r_{0|γ} = \frac{\langle v_{1|γ} \rangle_L}{\langle v_{0|γ} \rangle_R}, r_{2|γ} = \frac{\langle v_{1|γ} \rangle_R}{\langle v_{2|γ} \rangle_L}$$

$$r_{0|ω} = \frac{\langle v_{1|ω} \rangle_L}{\langle v_{0|ω} \rangle_R}, r_{2|δ} = \frac{\langle v_{1|ω} \rangle_R}{\langle v_{2|ω} \rangle_L}$$

Put another way, the processing systems 543 may determine a correction function (e.g., a ratio) for PRNU suppression corresponding to a light illumination level, a dark illumination level, and an intermediate illumination level.

Lastly, the six ratios determined may be stored (e.g., in memory), and in performing subsequent calibration surface PRNU characterization, each of the plurality of processing systems may adjust the calibration surface PRNU targets for every pixel in the corresponding capture apparatus (e.g., scan bar) by the respective correction function (e.g., respective ratio). For example, using the operations:

$$ḋ_t = r_δ d_t$$

$$ġ_t = r_γ g_t$$

$$ẇ_t = r_ω w_t$$

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "Q", "R", "S", and "T" particularly with respect to reference numerals in the drawings, indicate that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A method for photo response-non-uniformity (PRNU) suppression, comprising:
    performing a calibration surface PRNU characterization using a scanning system;
    performing a document-based PRNU characterization using the scanning system;
    determining a correction function for PRNU suppression for the scanning system based on the calibration surface PRNU characterization and the document-based PRNU characterization; and
    suppress PRNU regions in an output of the scanning system by adjusting calibration surface PRNU targets according to the calibration surface PRNU characterization and the document based PRNU characterization.

2. The method of claim 1, wherein performing the calibration surface PRNU characterization includes:
    scanning a calibration surface of the scanning system; and
    determining a calibration surface PRNU corrected output value based on the scanned calibration surface.

3. The method of claim 1, further comprising suppressing PRNU regions in an output of the scanning system by applying the correction function to the output.

4. The method of claim 1, wherein determining the calibration surface PRNU characterization includes determining a blended region output response for each of a plurality of overlapping regions in an output of the scanning system.

5. The method of claim 1, further comprising suppressing PRNU regions in an output of the scanning system by adjusting calibration surface PRNU targets according to the calibration surface PRNU characterization and the document based PRNU characterization.

6. A non-transitory machine readable medium storing instructions executable by a processor to cause the processor to:
    determine a calibration surface photo response-non-uniformity (PRNU) characterization using a scanning system;
    determine a document-based PRNU characterization using the scanning system;
    determine a correction function for PRNU suppression for the scanning system based on the calibration surface PRNU characterization and the document-based PRNU characterization; and
    suppress PRNU regions in an output of the scanning system by adjusting calibration surface PRNU targets according to the calibration surface PRNU characterization and the document based PRNU characterization.

7. The medium of claim 6, wherein the instructions to determine a calibration surface PRNU characterization include instructions to determine a calibration surface PRNU compensation target for an intermediate illumination level.

8. The medium of claim 6, wherein the instructions to determine a calibration surface PRNU characterization include instructions to determine an average signal response between a plurality of adjacent scan bars in the scanning system.

9. The medium of claim 6, wherein the instructions to determine a calibration surface PRNU characterization include instructions to calculate calibration surface PRNU compensation parameters for each pixel in a blending zone.

10. The medium of claim 6, wherein the instructions to determine a document-based PRNU characterization include instructions to scan a test document using the scanning system at a dark level, a medium level, and a light level.

11. The medium of claim 10, wherein the instructions to determine a document-based PRNU characterization include instructions to determine document-based PRNU compensation parameters for pixels of the document scan.

12. A large format capture apparatus for photo response non-uniformity (PRNU) suppression, comprising:
    a plurality of capture apparatuses, wherein each capture apparatus includes:
        a sensor system to produce a response signal quantifying an amount of light reflected from a sample; and
        a processing system to:
            determine a calibration surface PRNU characterization;
            determine a document-based PRNU characterization;
            determine a correction function for PRNU suppression based on the calibration surface PRNU characterization and the document-based PRNU characterization; and
            suppress PRNU regions in an output of the large format capture apparatus by applying the correction function to the output.

13. The apparatus of claim 12, wherein the plurality of capture apparatuses are staggered laterally and longitudinally to create blending zones.

14. The apparatus of claim 12, wherein each of the plurality of processing systems determines calibration surface PRNU compensation parameters for each pixel in a respective scan region.

15. The apparatus of claim 12, wherein each of the plurality of processing systems determines a correction function for PRNU suppression corresponding to a light illumination level, a dark illumination level, and an intermediate illumination level.

16. They apparatus of claim 12, further comprising each of the plurality of processing systems adjusting the calibration surface PRNU targets in the respective capture apparatus by the respective correction function.

* * * * *

UNITED STATES PATENT AND TRADEMARK OFFICE
CERTIFICATE OF CORRECTION

PATENT NO. : 10,341,504 B2
APPLICATION NO. : 15/747653
DATED : July 2, 2019
INVENTOR(S) : David Berfanger et al.

Page 1 of 1

It is certified that error appears in the above-identified patent and that said Letters Patent is hereby corrected as shown below:

In the Claims

In Column 12, Line 56, in Claim 16, delete "They" and insert -- The --, therefor.

Signed and Sealed this
Thirty-first Day of December, 2019

Andrei Iancu
*Director of the United States Patent and Trademark Office*